United States Patent [19]

Cenko et al.

[11] 4,164,063

[45] Aug. 14, 1979

[54] PROCESS FOR MAKING BEARING LOCKING COLLAR

[75] Inventors: John Cenko, Huron; Thomas C. Pechauer, Norwalk, both of Ohio

[73] Assignee: General Motors Corporation, Detroit, Mich.

[21] Appl. No.: 880,556

[22] Filed: Feb. 23, 1978

[51] Int. Cl.² .............................................. B22F 3/24
[52] U.S. Cl. .......................... 29/420.5; 29/149.5 PM; 308/236; 75/200
[58] Field of Search ............... 308/236; 29/149.5 PM, 29/420.5

[56] References Cited

U.S. PATENT DOCUMENTS

| | | | |
|---|---|---|---|
| 1,821,877 | 9/1931 | Bowne | 308/236 |
| 2,142,574 | 1/1939 | Murden | 308/236 |
| 3,036,872 | 5/1962 | King, Jr. et al. | 308/236 |
| 3,239,292 | 3/1966 | Howe, Jr. et al. | 308/236 |
| 3,284,146 | 11/1966 | Ripple | 308/236 |
| 3,294,459 | 12/1966 | Howe, Jr. | 308/236 |
| 3,676,917 | 7/1972 | Wayson et al. | 29/420.5 |
| 3,836,355 | 9/1974 | Lindskog et al. | 75/123 D |
| 3,867,751 | 2/1975 | Connell et al. | 29/148.4 R |
| 4,017,951 | 4/1977 | Aromando | 29/149.5 PM |
| 4,094,559 | 6/1978 | Sularski | 29/149.5 PM |

FOREIGN PATENT DOCUMENTS

| | | | |
|---|---|---|---|
| 484699 | 7/1952 | Canada | 308/236 |
| 562643 | 9/1958 | Canada | 308/236 |
| 691116 | 7/1964 | Canada | 308/236 |

*Primary Examiner*—C. W. Lanham
*Assistant Examiner*—V. K. Rising
*Attorney, Agent, or Firm*—Charles R. Engle

[57] ABSTRACT

A process of making a locking collar for retaining bearings on a shaft by first compacting and sintering powdered metal to form a collar having an eccentric counterbore with a relative precise chamfered surface on the collar end around the counterbore. The collar end is then swaged forming a back taper on the counterbore inner peripheral surface while providing a predetermined counterbore inner diameter.

3 Claims, 6 Drawing Figures

PROCESS FOR MAKING BEARING LOCKING COLLAR

This invention relates to a locking collar for fastening the inner ring of an antifriction bearing assembly on a shaft. More specifically, this invention relates to a method of forming such a locking collar by use of sintered powdered metal eliminating several machining steps presently used.

The subject locking collar contains a shaft receiving aperture that is concentric with the collar exterior peripheral surface. An eccentric counterbore having a back tapered wall surface is provided in one end of the collar. The inner race ring of the bearing assembly has an integral axially extending back tapered annular flange. The flange is likewise eccentric to the supporting shaft. Assembly of the locking collar on the inner race ring is accomplished by placing the collar counterbore upon the inner race flange and rotating it until flange and collar counterbore eccentric back tapered surfaces frictionally engage. It is preferable to drill and tap a radial through hole in the collar for receipt of a set screw locking the collar to the shaft.

In accordance with the process of the subject invention, the locking collar is initially formed to contain the eccentric counterbore and a chamfered peripheral edge on the counterbore end by compacting and sintering powdered metal. The chamfer has a predetermined specific slope which is effective to regulate both the back taper angle in the eccentric counterbore and the inside diameter of the counterbore opening when the counterbore collar end surface is swaged finally structurally forming the locking collar. It is apparent that the subject process eliminates several machining operations required to produce the locking collar from rod or bar steel stock.

Accordingly, it is a primary object of this invention to provide a method of making a bearing locking collar out of powdered metal.

Another object of this invention is the provision of a method of making a bearing locking collar having a back tapered eccentric counterbore out of powdered metal.

A further object of this invention is the provision of a process of making a bearing locking collar initially formed out of powdered metal and subsequently swaged to form a predetermined back tapered wall surface in an eccentric counterbore while regulating the inside diameter of the counterbore.

Other objects and advantages of this invention will be apparent to those skilled in the art from the following description of one specific embodiment of the invention, as illustrated in the annexed drawings, in which.

Figure 1:
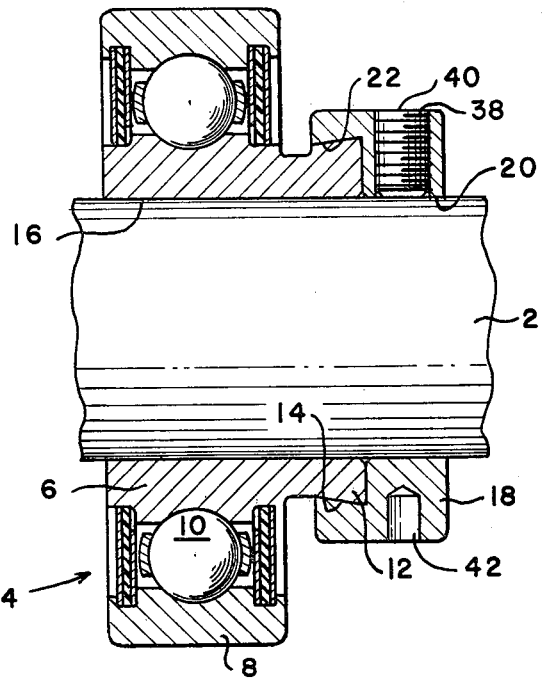
FIG. 1 is an elevational view, in section, showing a locking collar securing a bearing inner race ring to a shaft.
Figure 2:
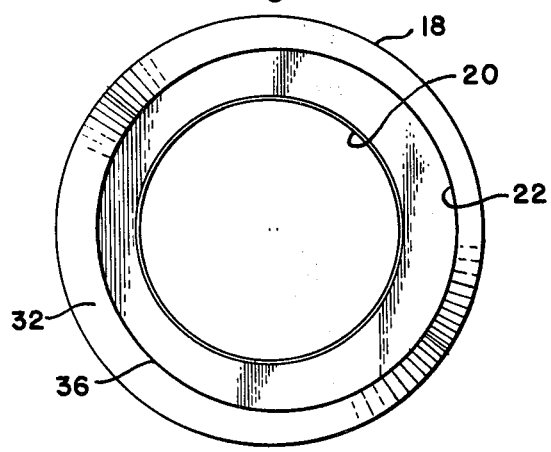
FIG. 2 is a plan end view showing the counterbore of the locking collar as initially formed by a sintering process.

Referring now to FIG. 1, a shaft 2 is shown supporting a bearing assembly 4 including inner race ring 6 and outer race ring 8 with a plurality of balls 10 therebetween. The inner race ring 6 is provided with an integral flange 12 having a back tapered surface 14. The inner race ring 6 also contains an aperture 16 receiving shaft 2. The aperture 16 is concentric with inner ring 6 while the flange 12 is eccentric to the ring and aperture 16. A locking collar 18, which is the subject of this invention, contains a concentric aperture 20 permitting the collar to be mounted on shaft 2. In addition the collar contains a counterbore 22 which is eccentric to the collar center axis and the aperture 20 as illustrated in FIG. 2.

Figure 3:
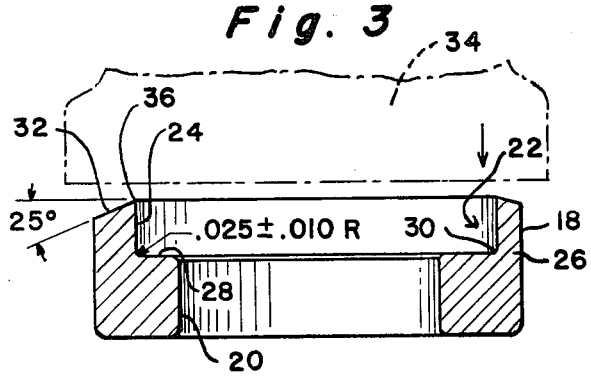
FIG. 3 is a sectional view showing the locking collar of FIG. 2 prior to being swaged by a tool shown in phantom.

With reference to FIG. 3, a perform structure of the collar 18 is shown. A powdered metal providing desired strength characteristics is compacted in a preform die and sintered. The counterbore 22 has vertical peripheral walls 24 substantially parallel to the collar outer peripheral surface 26. The walls 24 connect with a flat bottom surface 28 defining the counterbore 22. A small counterbore corner radius 30, for example 0.025±0.010 inches, is provided between the wall 24 and surface 28 for reducing stress concentrations at the intersection of these surfaces. This is a conventional structure as illustrated in U.S. Pat. No. 2,728,616 issued Dec. 27, 1955 to H. L. Potter.

The preform also includes a chamfered surface 32 which is formed concentric with the inner diameter of the counterbore 22 and eccentric to the shaft receiving aperture 20. The chamfer of surface 32 is regulated to 25°±1° during the compacting of the preformed collar 18 for a purpose later identified. FIG. 3 additionally illustrates a swaging tool 34, shown in phantom, which engages an annular edge or relatively narrow circumferential end surface 36 for producing the finished locking collar configuration shown in FIGS. 5 and 6. In the finished form, collar 18 includes a back taper angle $\alpha$ in the range of 6°–9° on the wall 24'. This back taper angle is developed by the swaging of end surface 36 when engaged by tool 34. Preforming of chamfered surface 32 to the aforementioned angle of 25°±1° assures the desired $\alpha$ angle range of back taper on inner peripheral wall 24'. The back taper angle $\alpha$ ranges from 6°–9° around the inner peripheral wall 24' due to variance in collar wall thickness around the counterbore 22. As can be seen, the swaging of end surface 36 develops a wider flat end surface 36' and the chamfered surface 32' becomes significantly more narrow.

From the above discussion, it is seen that this invention provides a process for producing a locking collar 18 without requiring the usual machining operations. The composition of the powdered metal used in the preform compacting die can be of any composition giving the locking collar its desired strength characteristics. A preferred iron-phosphorus alloy, for purposes of illustration only, has the following nominal composition by weight:

| | |
|---|---|
| Fe | 98.8% |
| C | 0.02% |
| P | 0.45% |

| -continued | |
|---|---|
| H₂ loss | 0.13% |

Figure 4:
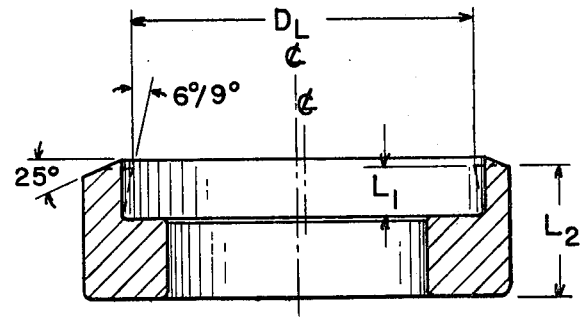
FIG. 4 is a sectional view illustrating the dimensional relationship of the locking collar before and after swaging of the initially formed collar of FIG. 3.
Figure 5:
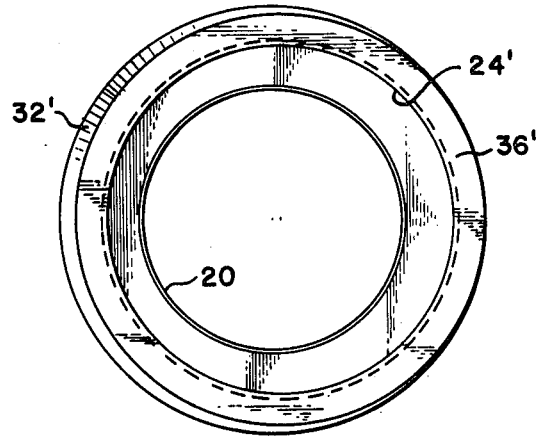
FIG. 5 is a plan end view showing the counterbore of the locking collar after the swaging operation forming a back taper in the counterbore walls.
Figure 6:
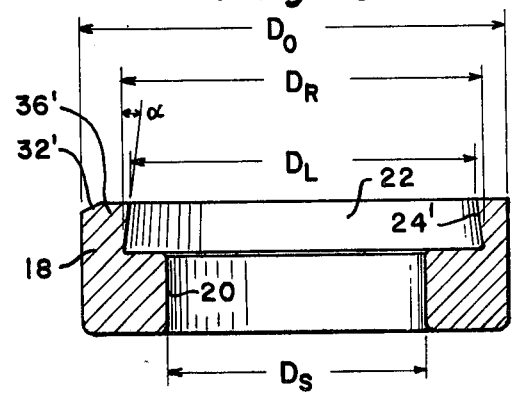
FIG. 6 is a sectional view showing a locking collar swaged to a final form.

It has been found that a maximum of 0.20% carbon content by weight is critical to prevent cracking at the counterbore corner radius 30. In practicing the process of our invention, it is necessary to blend a suitable lubricant such as zinc stearate or acro wax in a range by weight of 0.75 to 1.00% with the powder and pour the mixture into a preform die. The powdered metal and lubricant blend is then compacted to a density ranging from 6.9 to 7.2 grams per cubic centimeter. The green compact is then sintered in a reducing gas atmosphere at a temperature ranging from 2050° F. to 2100° F. for a time period of 30 to 60 minutes. The preform structure of the collar 18 is then swaged by the tool 34, illustrated in FIG. 3, to form the reverse or back taper angle on wall 24' as shown in FIGS. 4, 5 and 6. The collar is then subjected to a tumbling operation to remove any scale or rough surfaces left by the compacting and sintering steps. A radial hole 38 is drilled and taped in the collar permitting installation of a setscrew 40 for locking and retaining the collar on the shaft 2 as shown in FIG. 1. A radial drift pin hole 42 is also drilled 120° from the set screw hole to help secure the collar in place with the aid of a drift pin or spanner wrench if the particular installation so requires. Lastly, a preferred process includes the step of black oxiding the collar surfaces for preventing rust and corrosion.

With reference now to FIGS. 4 and 6, the collar 18 of course can be of any one of several desired dimensions. The shaft receiving aperture 20 necessarily will have a diameter $D_s$ which will permit assembly of the collar upon a particular shaft. The counterbore 22 in the collar 18 will have dimensions $D_L$ and $D_R$ for assembly upon the eccentric inner race ring flange 12 shown in FIG. 1. By virtue of their eccentric configurations, placement of the collar counterbore 22 over the flange 12 and subsequent rotation of the collar forces the flange back tapered surface 14 into frictional engagement with the back tapered counterbore wall 24' locking these members together for tight securing to the shaft 2 via the setscrew 40. The frictional engagement of these back tapered surfaces resists lateral movement of the assembly during rotating operation of the bearing. The aforementioned control of the chamfered surface 32 to 25°±1° assures the dimension $D_L$ at the outer end of the back tapered wall 24' of the counterbore subsequent to the swaging of the end surface 36 while forming the back taper. The outside diameter $D_o$ of locking collar 18, of course, has to be sufficient to permit receipt of counterbore 22 and withstand loading in its particular operational environment. The dimensions of the collar 18 may be varied to suit specific use requirements.

Referring now to FIG. 4, the swaging operation is seen to accomplish not only the predetermined controlled diameters $D_R$ and $D_L$ of the collar 18 but it also provides a product having a counterbore 22 having a predetermined controlled depth $L_1$ and results in a predetermined overall collar 18 length $L_2$. These controlled features result from the 25° angle of the preform chamfer in conjunction with a particular preform hardness. It has been determined by the practice of our invention that a hardness range of Rockwell B50 to B80 is deemed essential for the material to move properly during the swaging of end surface 36. The minimum hardness characteristic has been found to insure desirable lateral flow of the material so that 6°-9° back angle taper in wall 24' is provided while the maximum limit prevents cracking.

It is evident from the above description that this invention provides a process for forming a locking collar that is more economical and efficient than those known in this art. More specifically, this invention discloses a method of forming a back taper surface without any machining of the part.

While we have shown and described a particular embodiment of our invention it will, of course, be understood that various modifications and alternative constructions thereof may be made without departing from the true spirit and scope of our invention and that we intend by the appended claims to cover all such modifications and alternative constructions as fall within the true spirit and scope of our invention.

What we claim is:

1. A process of making a locking collar from powdered metal comprising the steps of: compacting powdered metal into the form of a collar having a central shaft receiving aperture concentric with the collar exterior circumferential surface, the collar further having a counterbore eccentric to the shaft receiving aperture and the collar exterior circumferential surface, the compacting simultaneously forming a 24°-26° chamfer on the collar exterior circumferential surface around the eccentric counterbore and concentric therewith; sintering the compacted powdered metal; and swaging the end of said collar containing the eccentric counterbore forming a 6°-9° back taper in the counterbore inside diameter while maintaining a straight outside diameter on the collar exterior circumferential surface around the counterbore.

2. A process of making a locking collar from powdered metal comprising the steps of: pouring a suitable blend mixture of powdered iron alloy having a maximum 0.20% carbon and a lubricant into a forming die; compacting the mixture to a minimum density level of 6.9 grams per cubic centimeter into the form of a collar having a central shaft receiving aperture, the collar having an exterior circumferential surface concentric with said shaft receiving aperture, and a counterbore eccentric to the shaft receiving aperture and collar circumferential exterior surface, the compacting of the mixture also simultaneously forming a 24°-26° chamfered surface on the collar exterior circumferential surface around the eccentric counterbore concentric with the counterbore; sintering the powdered metal mixture and burning off the lubricant at a minimum temperature of 2050° F. for a minimum time period of 30 minutes; and swaging the end of said collar containing the eccentric counterbore forming a 6°-9° back taper in the counterbore inner peripheral surface while maintaining a straight outer peripheral surface on the collar exterior circumferential surface around the counterbore.

3. A process of making a locking collar from powdered metal comprising the steps of: pouring a blend mixture of powdered iron alloy consisting of an iron, 0.45% phosphorous, a maximum of 0.20% carbon and a lubricant into a forming die; compacting the mixture to a density level range of 6.9 to 7.2 grams per cubic centimeter into the form of a collar having a central shaft receiving aperture, the collar having an exterior circumferential surface concentric with said shaft receiving aperture and a counterbore eccentric to the shaft receiving aperture and collar circumferential exterior surface, the compacting of the mixture also simultaneously forming a 24°-26° chamfered surface on the collar exterior circumferential surface around the eccentric counterbore concentric with the counterbore; sintering the powdered metal mixture and burning off the lubricant at a temperature in the range of 2050° F. to 2150° F. for a minimum time period of 30 minutes providing a hardness range of Rockwell B50 to B80 in the collar; swaging the end of said collar containing the eccentric counterbore forming a 6°-9° back taper in the counterbore inner peripheral surface while maintaining a straight outer peripheral surface on the collar exterior circumferential surface around the counterbore, tumbling the locking collar providing a smooth outer surface; and applying a black oxide to the collar surfaces.

* * * * *